United States Patent
Imai et al.

(10) Patent No.: US 7,636,051 B2
(45) Date of Patent: Dec. 22, 2009

(54) STATUS MONITOR APPARATUS

(75) Inventors: Satoshi Imai, Kawasaki (JP); Akiko Yamada, Kawasaki (JP); Hitoshi Yamada, Tokyo (JP); Hitoshi Ueno, Kawasaki (JP); Koji Nakamichi, Kawasaki (JP); Akira Chugo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 11/443,921

(22) Filed: May 31, 2006

(65) Prior Publication Data

US 2007/0171085 A1    Jul. 26, 2007

(30) Foreign Application Priority Data

Jan. 24, 2006    (JP)    ............... 2006-015681

(51) Int. Cl.
G08B 21/00    (2006.01)

(52) U.S. Cl. .............. 340/657; 340/500; 340/540; 367/38; 367/43; 367/45; 375/224; 375/227; 375/228; 375/229; 375/232; 375/243; 375/300; 375/316; 375/318; 375/340; 361/182

(58) Field of Classification Search .......... 340/657, 340/500, 540; 375/224, 227, 228, 229, 232, 375/234, 300, 316, 318, 340; 361/182; 367/38, 367/43, 45

See application file for complete search history.

(56) References Cited

U.S. PATENT DOCUMENTS 5,602,761 A * 2/1997 Spoerre et al. .............. 702/179

FOREIGN PATENT DOCUMENTS

JP    2005-157579    6/2005
JP    2005-285040    10/2005

OTHER PUBLICATIONS

Sanghoon Lee and Sungwoon Choi, Adaptive Process Monitoring Using Scale CUSUM for Serially Correlated Processes, 1997, Comuter ind. Engng vol. 33, Nos. 3-4, pp. 737-740, Dept. of Industrial Engineering, Kyung Won University Seong Nam, Korea.*
Benjamin Friedlander, Lattice Filters for Adaptive Processing, Proceedings of the IEEE, vol. 70, No. 8, Aug. 1982.

* cited by examiner

Primary Examiner—Benjamin C Lee
Assistant Examiner—Sisay Yacob
(74) Attorney, Agent, or Firm—Fujitsu Patent Center

(57) ABSTRACT

A statistical value update unit calculates the fluctuation of measurement data. A filtering processing unit extracts a normal white noise component from the fluctuation of the measurement data using an adaptive lattice filter. A statistical test unit determines whether or not the variance of the normal white noise component is out of a predetermined scope in reference distribution. A change decision unit detects a stationary change of the status of a target system based on a detection ratio of an outlier.

14 Claims, 17 Drawing Sheets

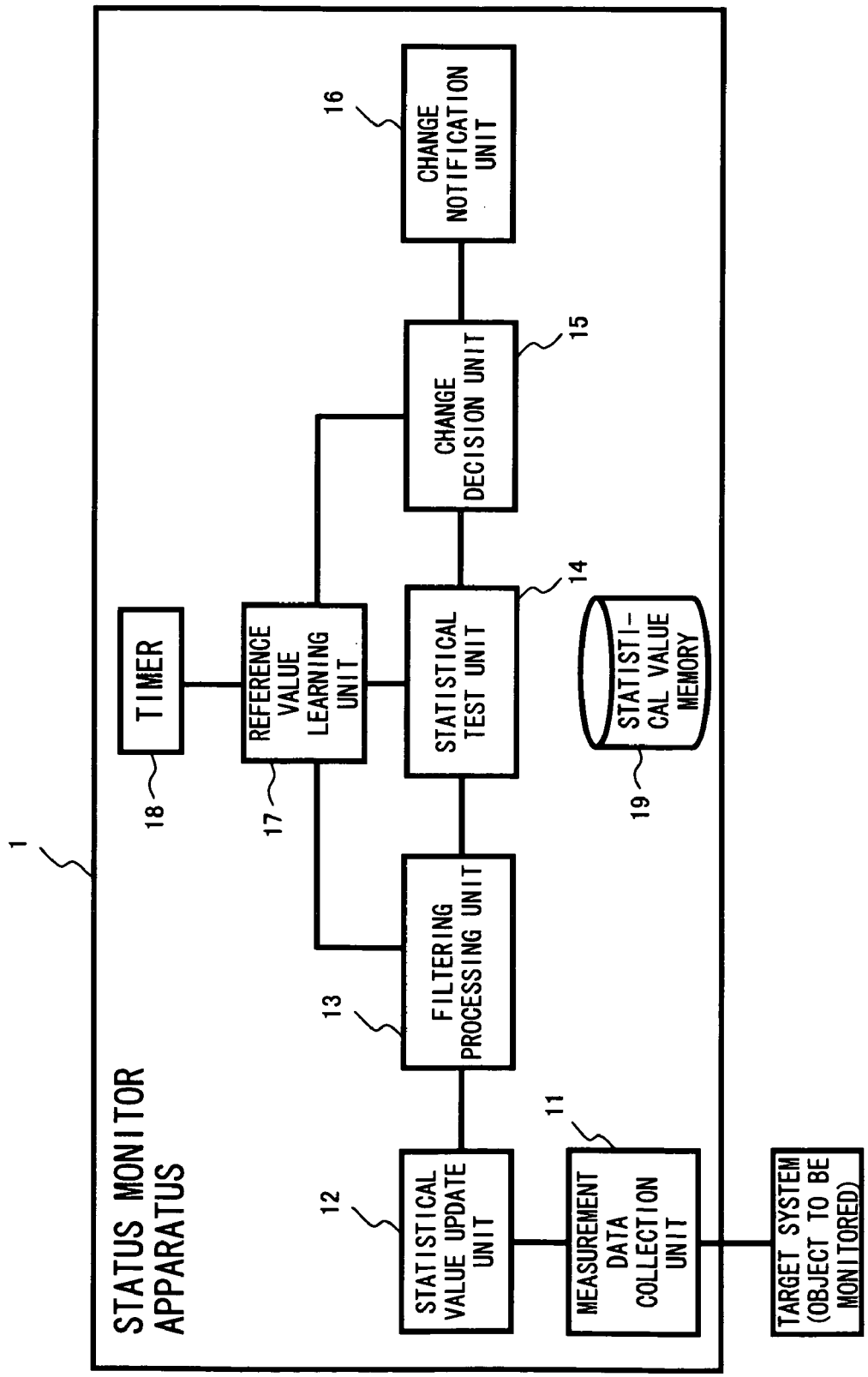
F I G. 1

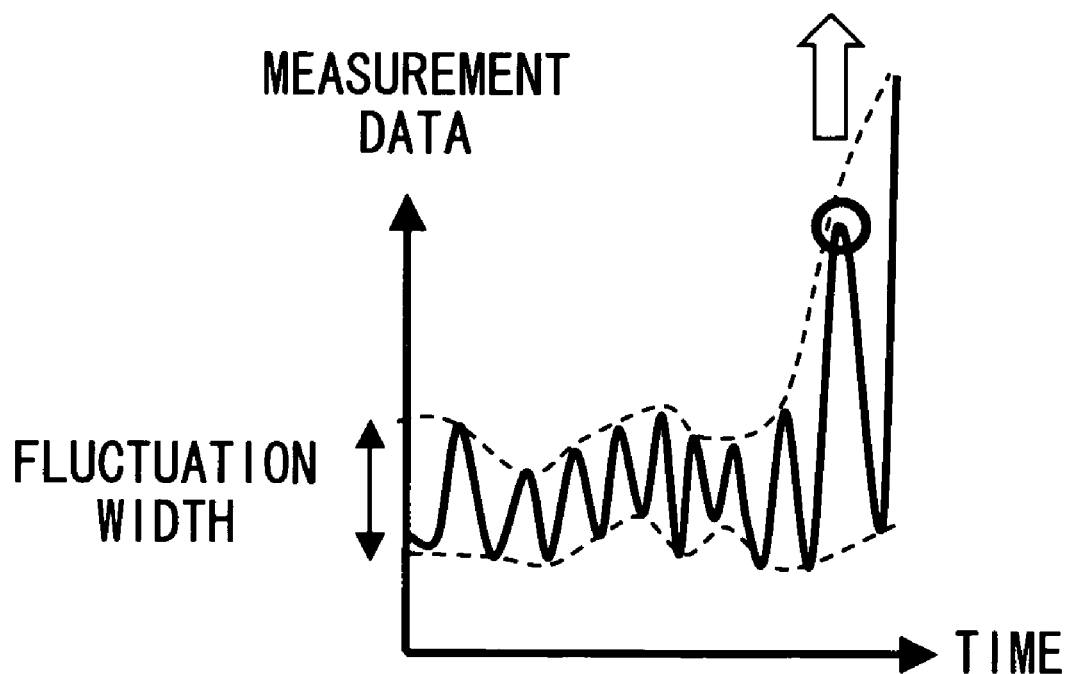
F I G. 2

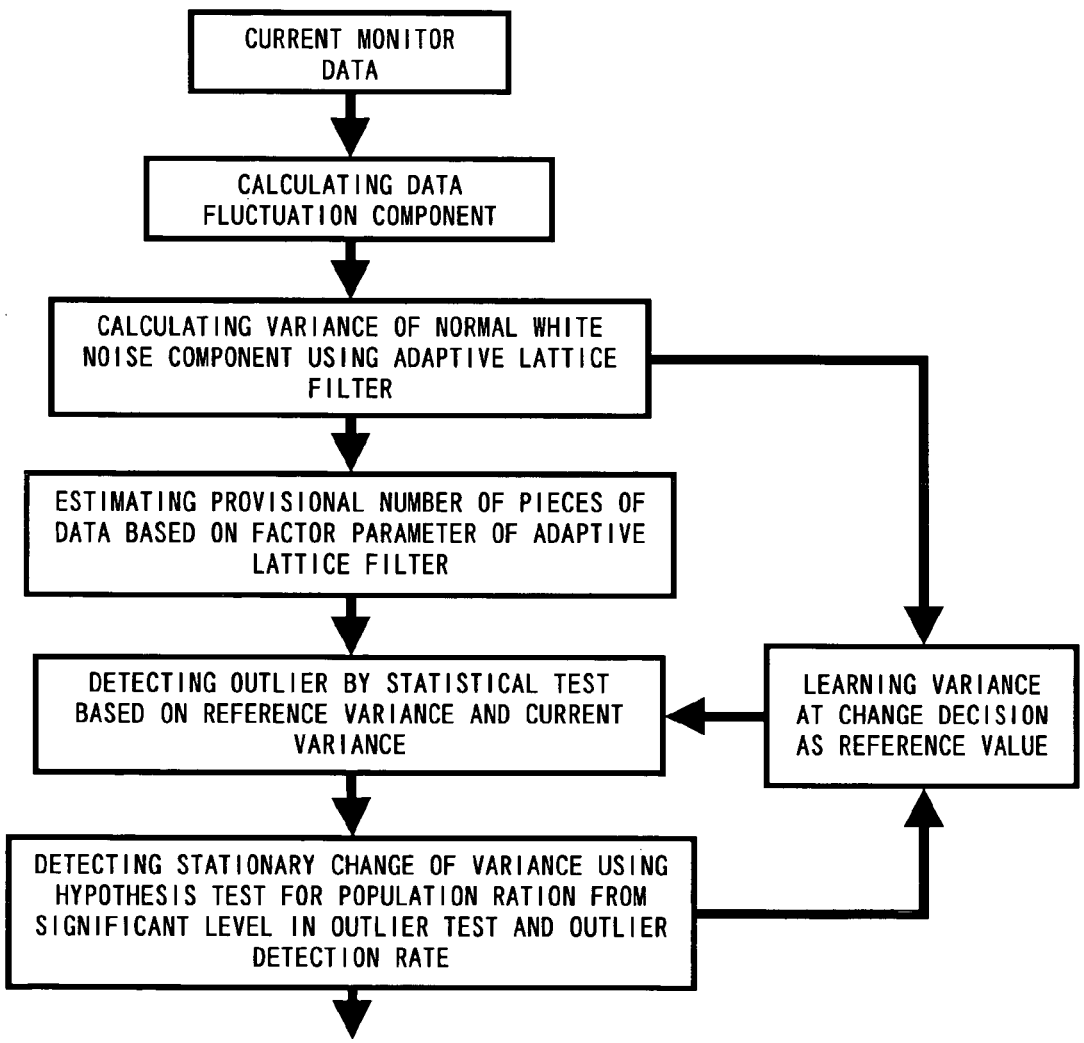
F I G. 3

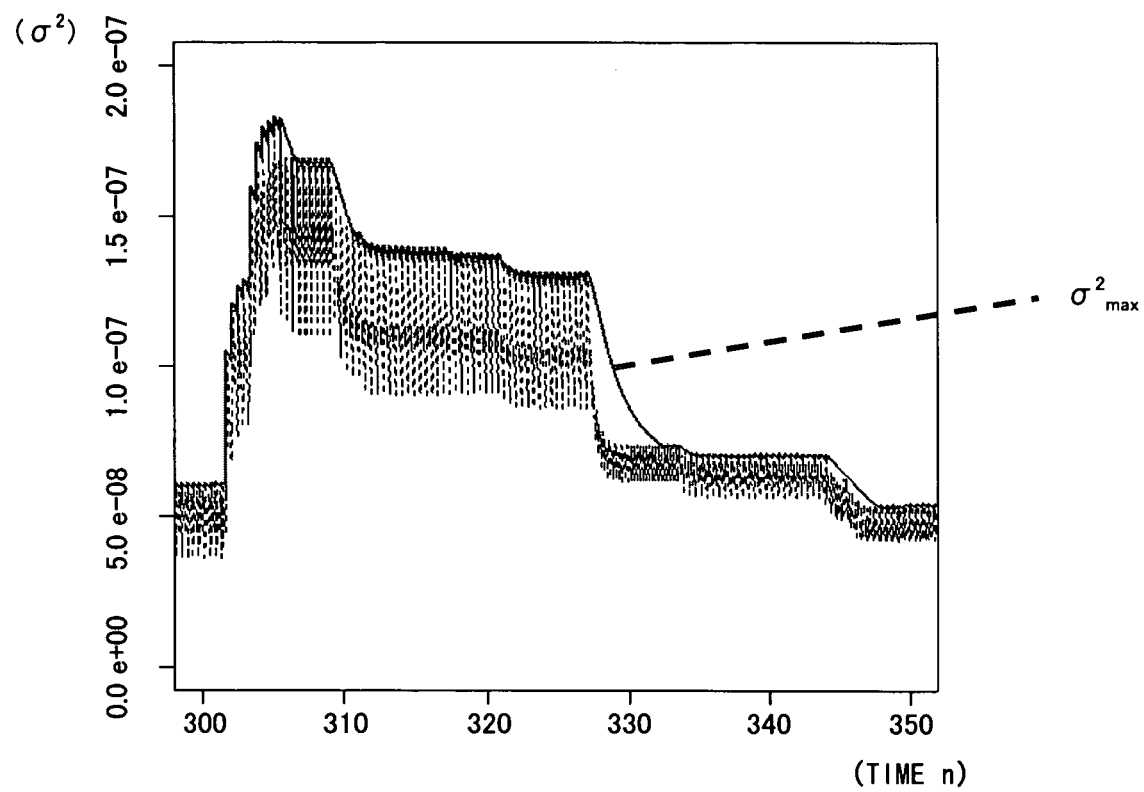
F I G. 4

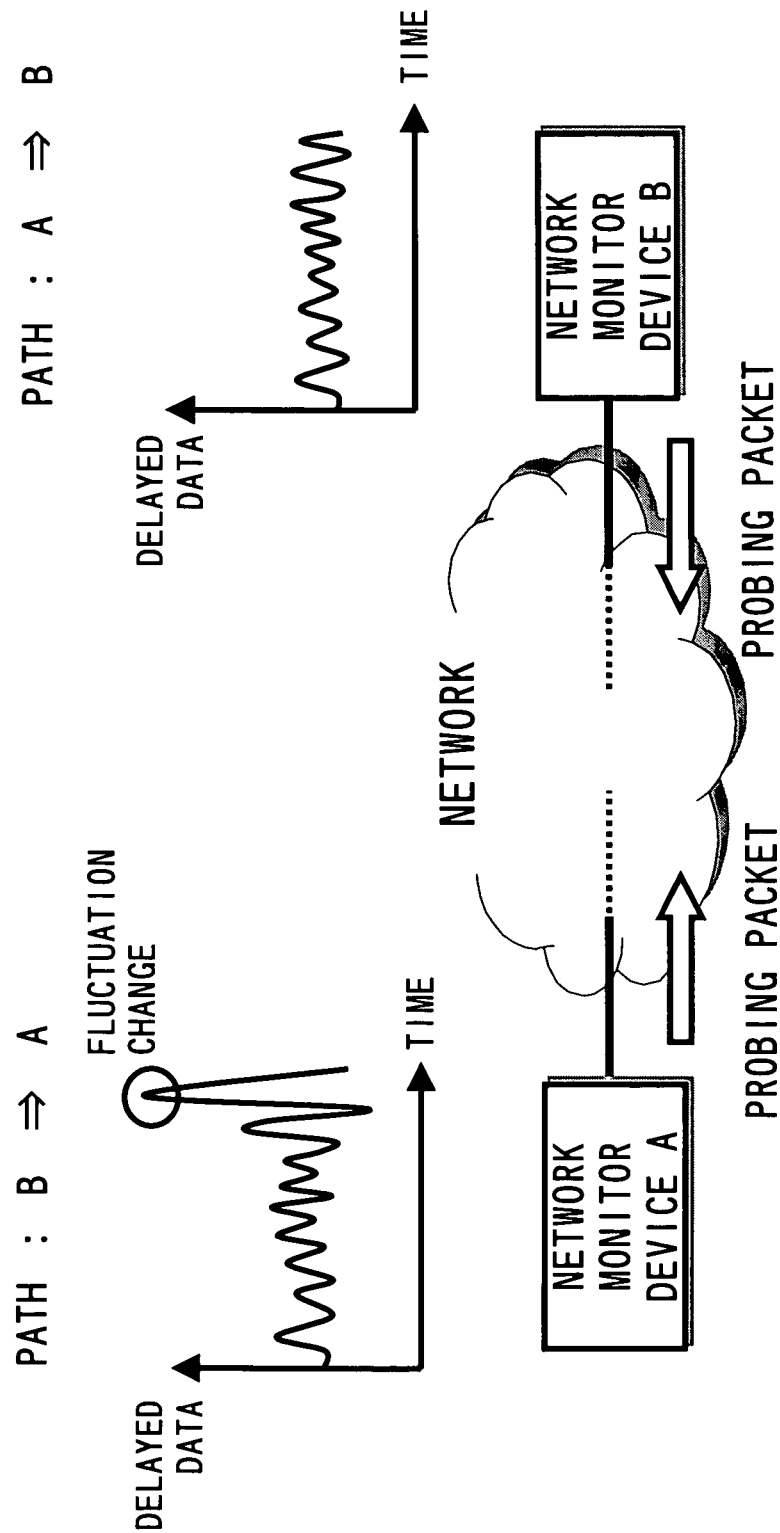
F I G. 10

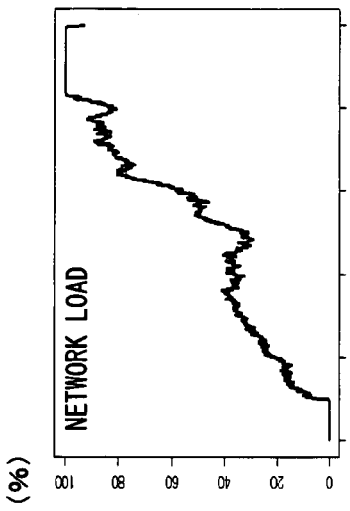
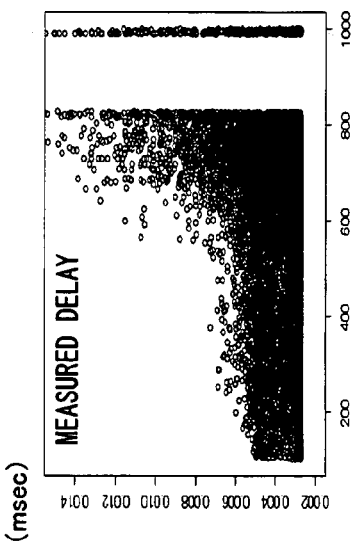
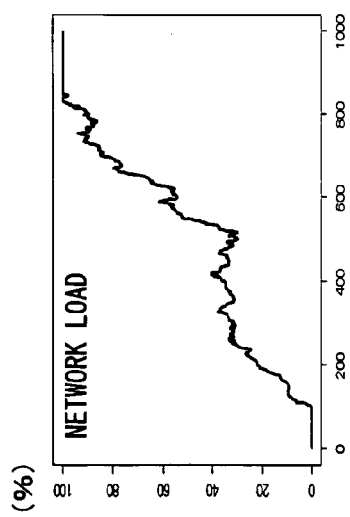
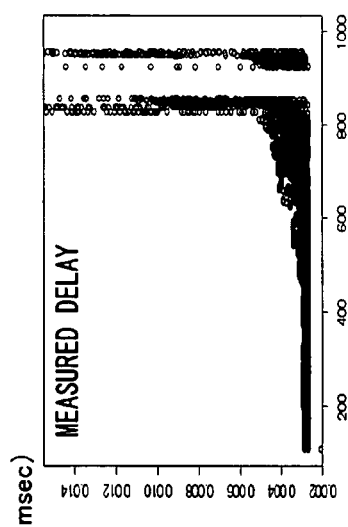
FIG. 11A
FIG. 11B

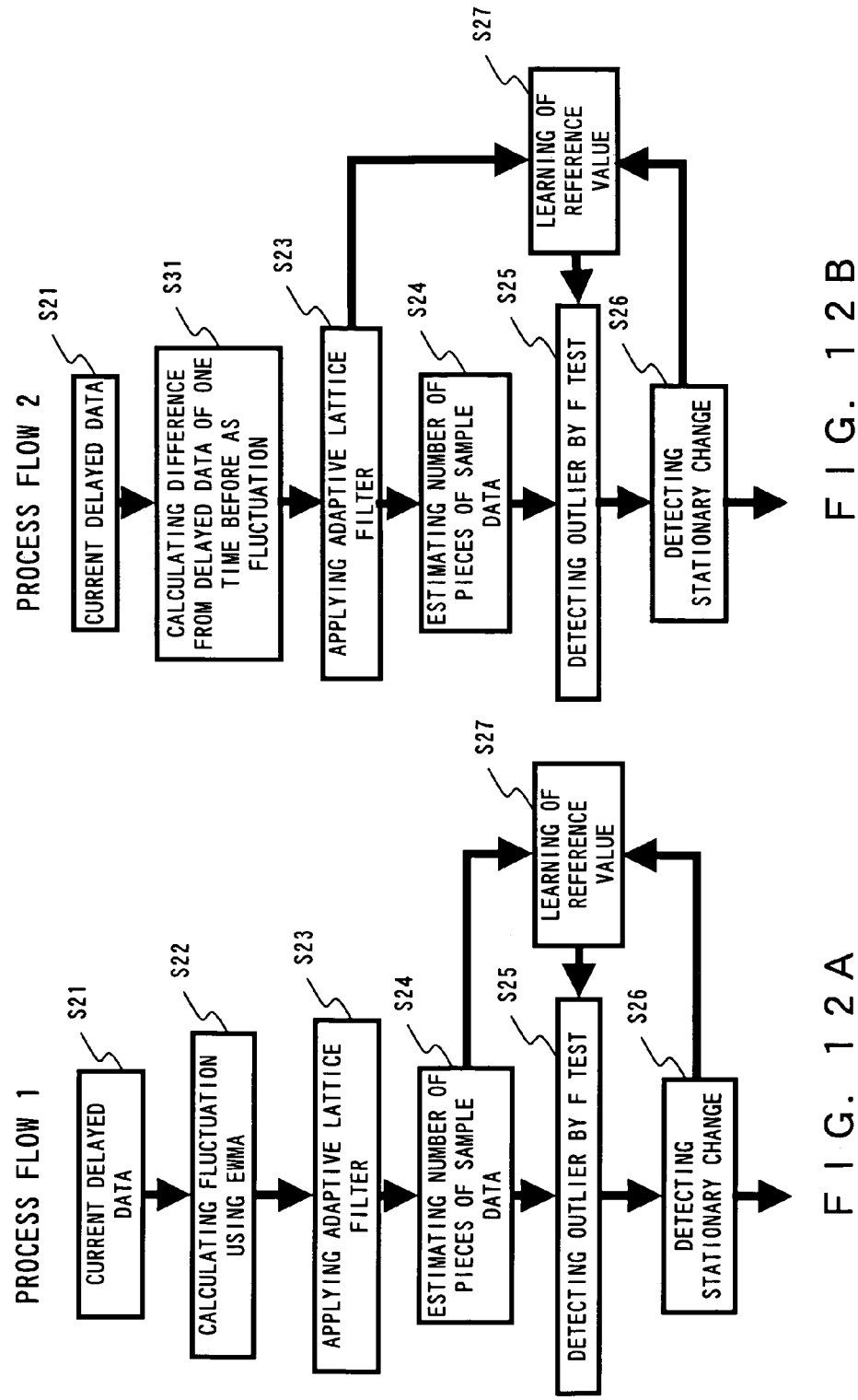

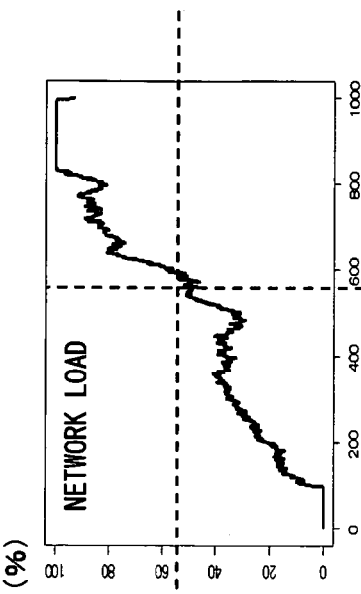
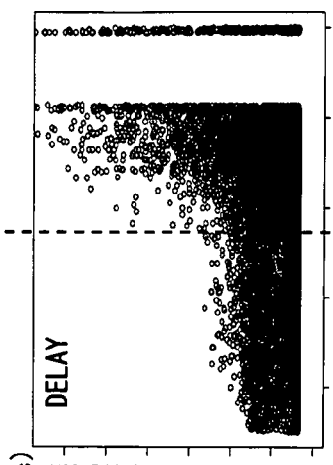
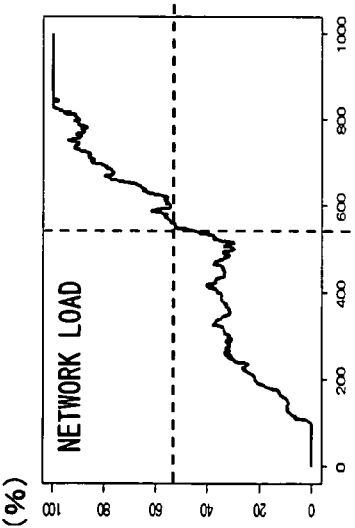
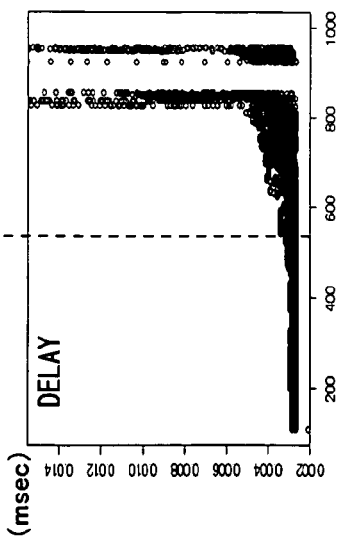
FIG. 13A
FIG. 13B

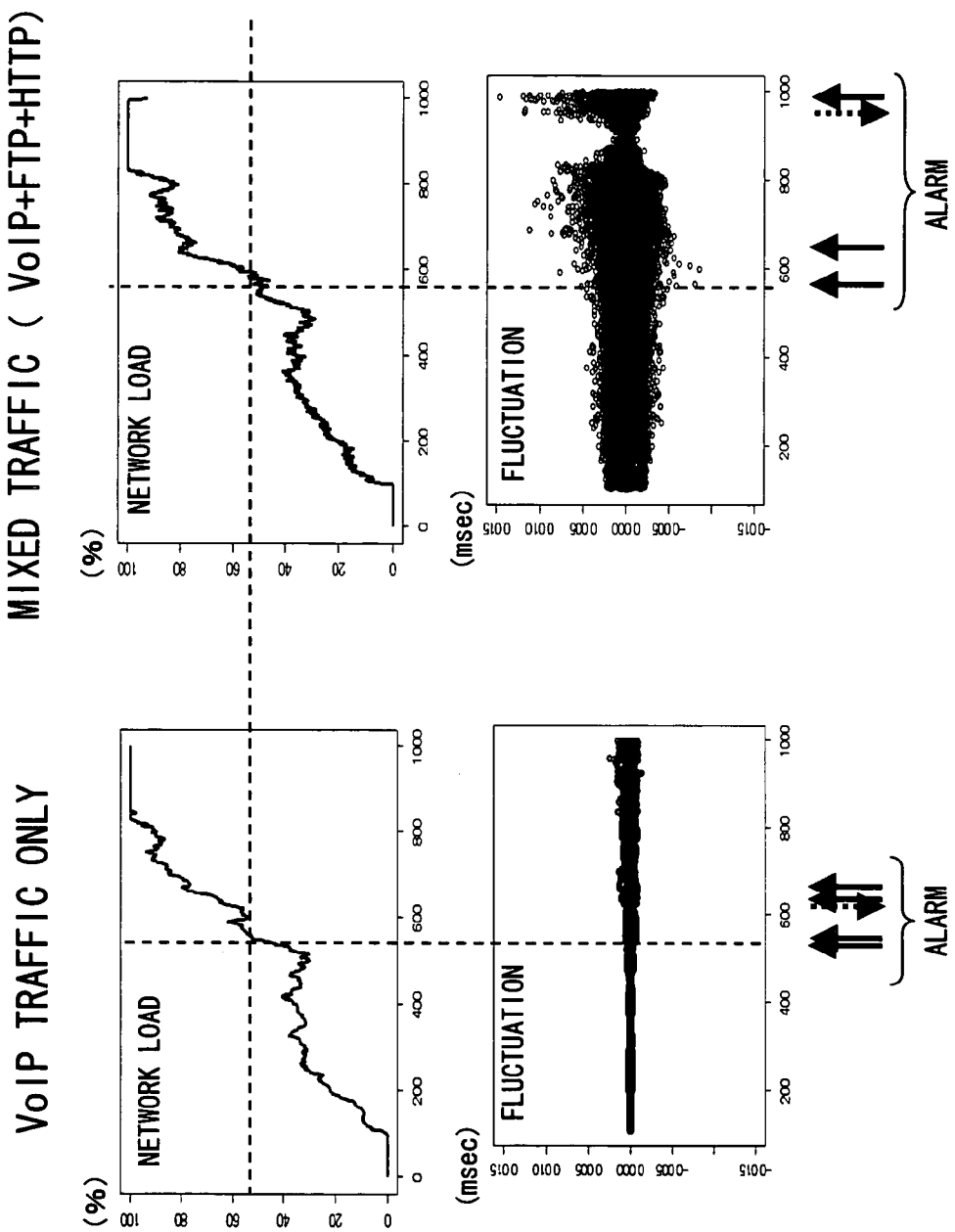

STATUS MONITOR APPARATUS

BACKGROUND OF THE INVENTION

1. Field of the Invention

The present invention relates to an apparatus and a method for detecting a change in status of an object to be monitored.

2. Description of the Related Art

Conventionally, a technique of continuously monitoring and analyzing the behavior of a communication system or various facilities has been studied to detect an abnormal condition or its foretaste. In this type of analysis, it is necessary to set various thresholds in advance for each parameter depending on the characteristic of monitor data. However, it is not easy to determine in advance an appropriate threshold.

On the other hand, the patent document 1 (Japanese Published Patent Application No. 2005-285040) describes a method of dynamically generating a threshold for determination of the status of an object to be monitored according to the statistics. However, it is necessary in this method that the following two prerequisites are satisfied.

Condition 1: The data to be processed is random (non-correlated) data.

Condition 2: The data has a specific distribution.

However, when a change of the status of an object to be monitored is detected, it is necessary to collect and analyze the measurement data about the object to be monitored in a time series. However, the time-series data is not random data because the time-series data has a correlation with the past data. Additionally, obtained data does not necessarily have a specific distribution. Therefore, it is difficult to apply the statistical method to the time-series data without modification.

To solve the problem, there is a method to detect a change of time-series data by considering that the modeling error on the time-series data is random and indicates white noise based on the normal distribution, and applying a statistical test to the white noise (for example, the patent document 2 (Japanese Published Patent Application No. 2005-157579)). The method described in the patent document 2 is described as follows.

A Kalman filter is applied to the data acquired from an object to be monitored. When the residual sequence Y(t) between the estimated value of the data by the Kalman filter and the acquired data is normal, the residual sequence Y(t) is a normal white noise vector having a mean value of zero and the covariance matrix is V(t). Therefore, the covariance matrix V(t) of the white noise vector in a normal state is obtained in advance, and a whiteness test is conducted on the residual sequence Y(t) according to $\chi^2$ test, thereby determining whether or not a system is normal.

Thus, according to the method described in the patent document 2, an abnormal condition of an object to be monitored can be detected, although the time-series data not satisfying the above-mentioned conditions 1 and 2 is monitored.

However, the Kalman filter used in the method described in the patent document 2 requires complex calculation and it is hard to monitor a large-scale system in real time. In the method described in the patent document 2, it is necessary to hold the past data sequence. Therefore, large memory is required. Furthermore, in this system, it is necessary to prepare a reference distribution in advance.

SUMMARY OF THE INVENTION

The present invention aims at reducing the hardware resources and performing a process at a high speed of an apparatus for detecting a change in status of an object to be monitored.

The status monitor apparatus according to the present invention includes: a collection unit for collecting data relating to the status of an object to be monitored in a time series; a calculation unit for calculating the fluctuation of data obtained by the collection unit; an extraction unit for applying an adaptive lattice filter to the fluctuation calculated by the calculation unit, and extracting the normal white noise component corresponding to the fluctuation from among the parameters appearing in the calculating process of the adaptive lattice filter; and a detection unit for detecting a change in the status of the object to be monitored based on the behavior of the normal white noise component extracted by the extraction unit.

In the present invention, since the noise component obtained by the extraction unit corresponds to the fluctuation of the data collected in a time series, it is time-series data. The noise component is random data, and has a normal distribution. Therefore, using the noise component, it can be statistically determined whether or not the status of an object to be monitored has changed. Since the adaptive lattice filter has low computational complexity, it performs a high-speed process, and requires less memory capacity.

In this status monitor apparatus, the detection unit may be designed to have a first decision unit for deciding whether or not the variance of the normal white noise component is out of a predetermined scope corresponding to a reference value, and a second decision unit for deciding whether or not the status of the object to be monitored has changed based on the decision result by the first decision device.

The status monitor apparatus may also be designed to further include an estimation unit for estimating the number of samples for a statistical test based on the forgetting factor used in the adaptive lattice filter. In this case, the first decision unit decides whether or not the variance is within a scope determined based on a reference value by a statistical test of the estimated number of samples. By implementing the number of samples, a statistical test (for example, an F test, a $\chi^2$ test, etc.) can be used.

Furthermore, the status monitor apparatus may be designed to further include a reference value update unit for updating the reference value using the variance of the normal white noise component when it is determined that the status of an object to be monitored has changed. With the configuration, the status is monitored using the new reference value after the status of the object to be monitored is changed, thereby appropriate decision is obtained.

According to the present invention, with a device for detecting a change of the status of a object to be monitored can reduce the required hardware resources and speed up a process. Furthermore, since it is not necessary to set various thresholds in advance, the status can be continuously monitored although the configuration of an object to be monitored has changed.

BRIEF DESCRIPTION OF THE DRAWINGS

FIG. 1 shows the configuration of the status monitor apparatus according to an embodiment of the present invention;

FIG. 2 shows the process of detecting a change in status;

FIG. 3 is a flowchart of the outline of an operation of the status monitor apparatus;

FIG. 4 shows the behavior of the variance and its maximum value;

FIG. 10 is an explanatory view of the configuration and operation of the network monitor system;

FIGS. 11A and 11B show the relationship between a traffic environment and delay characteristic;

FIGS. 12A and 12B are flowcharts of the process of determining the status of a network based on the delayed data;

FIGS. 13A and 13B show results (1) of a simulation of an operation of the status monitor apparatus;

FIGS. 14A and 14B show results (2) of a simulation of an operation of the status monitor apparatus;

DESCRIPTION OF THE PREFERRED EMBODIMENTS

Figure 5:
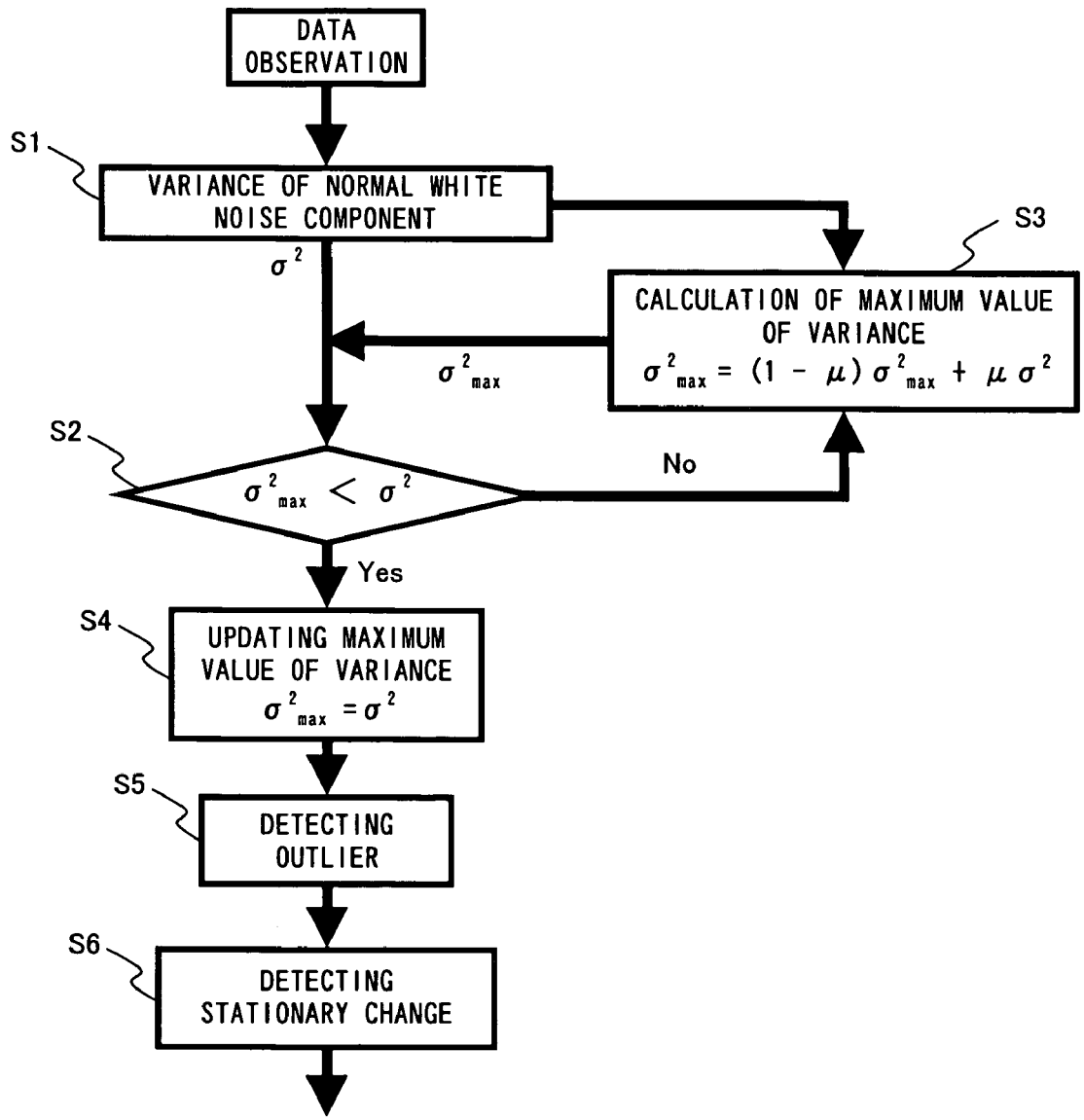
FIG. 5 is a flowchart of the process from calculating the variance to detecting a change in status.

The present invention relates to a method for automatically detecting a change in status of an object to be monitored. Although an object to be monitored is not specifically limited, for example, it can be a communication system and various facilities (machine tools, etc.) in a factory. When the status of a communication system is monitored, data such as the delay time of a packet, the amount of traffic, the discard rate of packets, error rate, etc. are collected in a time series. When the status of each facility is monitored, for example, the vibration amplitude of the equipment, etc. is collected in a time series. The embodiments of the present invention are explained below by referring to the attached drawings.

FIG. 1 shows the configuration of the status monitor apparatus according to an embodiment of the present invention. A status monitor apparatus 1 is realized by one or more computers, and provides the function of detecting a change in status by executing a program described in advance.

A measurement data collection unit 11 collects data relating to the status of an object to be monitored. Data can be periodically collected at predetermined time intervals, or when any event (for example, the transmission or reception of a packet) occurs.

A statistical value update unit 12 calculates the fluctuation of measurement data each time the measurement data collection unit 11 obtains measurement data. A filtering processing unit 13 calculates the variance of a normal white noise component by applying an adaptive lattice filter to the fluctuation of the measurement data.

A statistical test unit 14 estimates the number of samples for statistically processing the variance of a normal white noise component based on a factor parameter used in the adaptive lattice filter algorithm. The statistical test unit 14 also applies a statistical test to a reference value from a reference value learning unit 17 and a variance value extracted by the filtering processing unit 13, and detects an outlier. A change decision unit 15 conducts a hypothesis test for population ratio based on the significant level and the outlier detection ratio in the outlier test, and detects a stationary change of a variance value. When the stationary change of the variance value is detected, a change notification unit 16 raises an alarm indicating that the status of the object to be monitored has changed.

The reference value learning unit 17 learns as a new reference value a variance value obtained when a change of the status is detected by the change decision unit 15. The new reference value can also be learned at predetermined intervals kept by a timer 18. A statistical value memory 19 holds data and various parameters for use in the above-mentioned processes by the status monitor apparatus 1.

Thus, the status monitor apparatus 1 detects a change of the status of a target system based on the fluctuation of measurement data. FIG. 2 shows the process of detecting a change of the status.

FIG. 3 is a flowchart of the outline of the operation of the status monitor apparatus 1. The process is performed each time measurement data is acquired from an object to be monitored. Since the process in the flowchart has been explained above by referring to FIG. 1, the explanation is omitted here.

The operation of the status monitor apparatus 1 is described below in detail.

<Method of Calculating the Fluctuation of Data>

(1) First Method

In the first method, an EWMA (exponential weighted moving average) is calculated as a mean value of data. The difference between the mean value (that is, the EWMA) and the measurement data is defined as the fluctuation of the data. That is, the mean value T of the measurement data at a time n is expressed by the following equation.

$$T[n]=(1-\lambda)T[n-1]+\lambda x[n]$$

where x[n] refers to the measurement data at time n. $\lambda$ ($0<\lambda<<1$) indicates a predetermined forgetting factor set in advance. The fluctuation p of data is expressed as follows.

$$p[n]=x[n]-T[n]$$

In the method of calculating the fluctuation of data using the EWMA, the data used in the immediately previous arithmetic operations are required, but older measurement data is not required.

(2) Second Method

In the second method, the difference between new measurement data and immediately previous measurement data is defined as the fluctuation of data. That is, in this method, the fluctuation p of the data is expressed by the following equation.

$$p[n]=x[n]-x[n-1]$$

<Method of Extracting Variance of Normal White Noise Component Using Adaptive Lattice Filter>

In this example, the fluctuation p[n] of data at time n follows the m-th order Auto Regressive (AR) model. That is, the following equation is satisfied.

$$p[n] = -\sum_{i=1}^{m} a_i p[n-i] + \epsilon[n] \qquad (1)$$

where the order m of the AR parameter ai (i=1, 2, ..., m) is determined according to the Akaike's information criterion AIC described later each time measurement data is acquired. The value ε[n] indicates a prediction error predicted when a modeling process is performed, and corresponds to white noise. That is, the mean value of ε[n] is zero, and the variance of ε[n] has a normal distribution. That is, the statistical method can be applied to the variance of the prediction error of an AR model although it is time-series data corresponding to the status of an object to be monitored. Therefore, a change of the status of an object to be monitored can be detected using the variance of the prediction error of an AR model.

An adaptive lattice filter is used as an algorithm for estimating the AR parameter a appearing in the equation (1) above, and extracting the white noise ε. However, the purpose of using the adaptive lattice filter in the present invention is not to extract white noise itself, but to extract a parameter corresponding to the variance of white noise appearing in the calculating process of the adaptive lattice filter algorithm. The adaptive lattice filter is a well-known technique as an algorithm of estimating a parameter to a non-stationary time-series data, and described in detail in the following non-patent document.

Non-patent Document 1: Benjamin Friedlander, "Lattice Filters for Adaptive Processing," Proceedings of the IEEE, Vol. 70, No. 8, August 1982

The algorithm of the adaptive lattice filter is described below.

First, an initial value is assigned to the following parameter. The initial value is assigned to each order. For example, when m=2, initial values are assigned to m=0, 1, and 2, respectively. "M" is the upper limit of the order m.

[initial value]:

for $0 \leq m < M$
$\gamma_m[-1] = \rho_m[-1] = \Delta_{m+1}[-1] = 0$

Next, the time update is calculated on the zero-order parameter. The time update is performed by the following equation (2). ω (0<<ω<1) is a forgetting factor, and is set in advance.

[Time Update]:

$$\left.\begin{array}{l} \text{for } 0 \leq n \\ \gamma_0[n] = 0 \\ \epsilon_0[n] = \rho_0[n] = p[n] \\ E_0^\epsilon[n] = E_0^\rho[n] = \omega E_0^\epsilon[n-1] + p[n]^2 \end{array}\right\} \quad (2)$$

Furthermore, the order of the AR model is updated by the following equation (3). The equation (3a) shows the time update of the mutual covariance Δ. The equation (3b) indicates the update of the order of the prediction error at time n. In the equation, "ε" and "ρ" respectively indicate the forward and backward prediction errors. The forward prediction error ε corresponds to the prediction error of the equation (1). The equation (3c) shows the update of the order of the covariance between the prediction error ε and the fluctuation p at the time n. In this equation, "$E^\epsilon$" and "$E^\rho$" indicate the covariance of the forward prediction error and the backward per, respectively. The "γ" refers to a likelihood parameter.

[Order Update in AR Model]:

$$\left.\begin{array}{l} \text{for } 0 \leq m < M \\ \Delta_{m+1}[n] = \omega \Delta_{m+1}[n-1] + \dfrac{\epsilon_m[n]\rho_m[n-1]}{1-\gamma_{m-1}[n-1]} \quad (3a) \\ k_{m+1}^\epsilon[n] = \dfrac{\Delta_{m+1}[n]}{E_m^\epsilon[n]} \\ k_{m+1}^\rho[n] = \dfrac{\Delta_{m+1}[n]}{E_m^\rho[n-1]} \\ \epsilon_{m+1}[n] = \epsilon_m[n] - k_{m+1}^\rho[n]\rho_m[n-1] \quad (3b) \\ \rho_{m+1}[n] = \rho_m[n-1] - k_{m+1}^\epsilon[n]\epsilon_m[n] \\ E_{m+1}^\epsilon[n] = E_m^\epsilon[n] - k_{m+1}^\rho[n]\Delta_{m+1}[n] \quad (3c) \\ E_{m+1}^\rho[n] = E_m^\rho[n-1] - k_{m+1}^\epsilon[n]\Delta_{m+1}[n] \\ \gamma_{m+1}[n] = \gamma_m[n] + \dfrac{\rho_{m+1}[n]^2}{E_{m+1}^\rho[n]} \end{array}\right\} \quad (3)$$

The value obtained by multiplying the parameter $E^\epsilon_m[n]$ appearing in the adaptive lattice filter algorithm by "1−ω" (that is, "$(1-\omega)*E^\epsilon_m[n]$") corresponds to the variance $\sigma^2$ of the prediction error ε when the number of samples is $1/(1-\omega)$. The "ω" indicates a forgetting factor used in the equations (2) or (3a). That is, the status monitor apparatus 1 estimates the number of samples from the forgetting factor ω, which is one of the parameters used in the adaptive lattice filter algorithm for the statistical process.

For the order m of the AR model, the value for minimizing the Akaike's information criterion AIC in the equation (4) is selected in the range of $0 \leq m < M$.

$$AIC(m)[n] = \min_m \left[ \log((1-\omega)*E_m^\epsilon[n]) + \frac{2(m+1)}{1/(1-\omega)} \right] \quad (4)$$

As an example, the process of obtaining m=2 based on the Akaike's information criterion AIC is shown below. First, the parameter in the zero order is calculated by the equation (2). Then, by substituting the calculated zero-order parameter to the equation (3), the first-order parameter is calculated. At this time, by the equation (4), the first-order Akaike's information criterion $AIC_1$ is obtained. Furthermore, by substituting the calculated first-order parameter to the equation (3); the second-order parameter is calculated. Similarly at this time, the second-order Akaike's information criterion $AIC_2$ is obtained. Then, $E^\epsilon_2[n]$, which is one of the second-order parameters for making the calculated Akaike's information criterion $AIC_i$ (i=1, 2) minimum, is extracted to obtain the variance of prediction error corresponding to the fluctuation of the data at the time n.

When the selected number of order m is used in the adaptive lattice filter algorithm, the variance $\sigma^2[n]$ of the prediction error at the time n is the variance of the normal white noise component. That is, the variance value is non-correlation data, and has a normal distribution. Therefore, a common statistical method (F test, $\chi^2$ test, etc.) can be applied to the variance value. That is, by applying a common statistical test method to the variance value, it can be statistically determined whether or not the status of the object to be monitored has stationarily changed.

Thus, when the status monitor apparatus 1 acquires the measurement data x[n] at the time n, the fluctuation p[n] of the data is calculated. Then, using the parameter obtained in the calculating process when the adaptive lattice filter is applied to the fluctuation p[n], the variance $\sigma^2[n]$ of the prediction error when the fluctuation of the measurement data at the time n is modeled is calculated.

<Method of Serially Calculating Maximum Value of Variance>

In the statistical test described later, the variance $\sigma^2$ can be used as is. However, the variance $\sigma^2$ obtained as described above is subject to an irregular change with the lapse of time. Therefore, in the embodiment, the configuration of calculating the maximum value of the variance in the short time area using a forgetting factor, and conducting a statistical test on the maximum value of the variance is implemented. In the following explanation, the "maximum value of variance" can be simply referred to as "variance".

The maximum value $\sigma^2_{max}[n]$ of variance is calculated by the following equation (5) where $\mu$ (0<<$\mu$<1) is a forgetting factor.

$$\left. \begin{array}{l} \text{if } \sigma^2_{\max}[n-1] \leq \sigma^2[n] \\ \quad \sigma^2_{\max}[n] = \sigma^2[n] \\ \text{otherwise} \\ \quad \sigma^2_{\max}[n] = (1-\mu)\sigma^2_{\max}[n-1] + \mu\sigma^2[n] \end{array} \right\} \quad (5)$$

Thus, when the variance $\sigma^2[n]$ at the time n is larger than the maximum value $\sigma^2_{max}[n-1]$ of variance obtained at the time n–1, the variance at the time n is set as a new maximum value. Otherwise, the maximum value $\sigma^2_{max}$ of the variance is updated using the variance $\sigma^2[n]$ at the time n and the forgetting factor $\mu$. FIG. 4 shows the variance and the behavior of its maximum value.

<Outline of Calculation of Variance and Subsequent Processes>

FIG. 5 is a flowchart of the process from the calculation of the variance to the detection of a status change. The process is performed each time measurement data is acquired from an object to be monitored.

In step S1, the variance $\sigma^2$ of the normal white noise component is calculated based on the acquired measurement data. In step S2, the maximum value $\sigma^2_{max}$ of the variance previously obtained is compared with the variance $\sigma^2$ obtained in step S1. If the variance $\sigma^2$ is equal to or smaller than the maximum value $\sigma^2_{max}$, then the maximum value $\sigma^2_{max}$ is updated using the forgetting factor $\mu$ in step S3. If the variance $\sigma^2$ is larger than the maximum value $\sigma^2_{max}$, the variance value is set as a new maximum value in step S4.

In step S5, an outlier is detected. That is, if the maximum value obtained in step S4 is out of a predetermined scope of the reference distribution, the maximum value is determined as an "outlier". In step S6, it is determined based on the detection probability of an outlier whether or not the status of an object to be monitored has changed. That is, when the detection probability of an outlier exceeds a predetermined value, it is determined that the status of an object to be monitored has stationarily changed. Thus, the detection of the outlier and decision of a change of the status is performed when a newly obtained variance $\sigma^2$ is larger than the maximum value $\sigma^2_{max}$ of the variance previously obtained.

<Method of Detecting Outlier>

(1) F Test

In the description below, it is assumed that the reference value $\sigma^2_0$ is held in the reference value learning unit 17. The variance $\sigma^2_{max}[n]$ of the normal white noise at time n is assumed to have been calculated as described above. The values $\sigma^2_0$ and $\sigma^2_{max}[n]$ are derived by the adaptive lattice filter algorithm, and the number of samples is $1/(1-\omega)$. Therefore, the F value of the F test is expressed by the following equation (6).

$$F_0[n] = \frac{\sigma^2_{\max}[n]}{\sigma^2_0} \quad (6)$$

Assuming that the F test is conducted on both sides of the significant level $\alpha$ in the distribution F with the degree of freedom $\phi_0$ and $\phi_1$, it is determined according to the following rule whether or not the variance $\sigma^2_{max}$ is an outlier. The degree of freedom $\phi_0$ and $\phi_1$ are respectively "number of samples–1 that is, $\{1/(1-\omega)\}-1$". Furthermore, $F^\alpha(\phi_0, \phi_1)$ and $F_\alpha(\phi_0, \phi_1)$ are respectively the upper side $\alpha$ point and the lower side $\alpha$ point in the F distribution with the degree of freedom $\phi_0$ and $\phi_1$.

$$F^{\alpha/2}\left(\frac{1}{1-\omega}-1, \frac{1}{1-\omega}-1\right) < F_0[n] \rightarrow \text{outlier of upper side}$$

$$F_0[n] < F_{\alpha/2}\left(\frac{1}{1-\omega}-1, \frac{1}{1-\omega}-1\right) \rightarrow \text{outlier of lower side}$$

Figure 6:
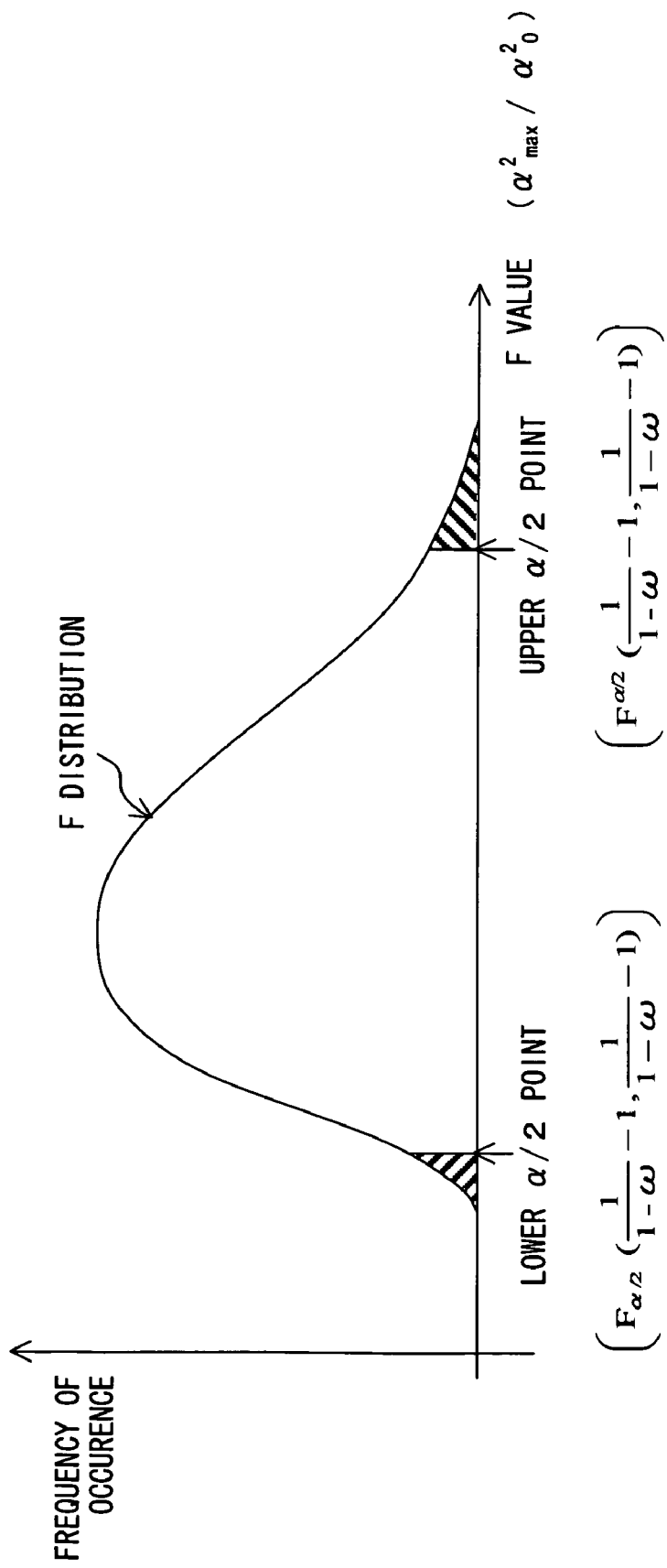
FIG. 6 is an explanatory view of an outlier by an F test.

In the F distribution shown in FIG. 6, when the F value is larger than the upper side $\alpha/2$, it is determined that the F value is an outlier of upper side. If the F value is smaller than the lower side $\alpha/2$, it is determined that the F value is an outlier of lower side. The upper side $\alpha/2$ point is a value whose probability of detecting the F value larger than the upper side $\alpha/2$ point of the F distribution is $\alpha/2$ percent. Similarly, the lower side $\alpha/2$ point is a value whose probability of detecting the F value smaller than the lower side $\alpha/2$ point of the F distribution is $\alpha/2$ percent. That is, the probability that the F value is an outlier is statistically $\alpha$ percent. The $\alpha$ is determined depending on the system of an object to be monitored, and is, for example, several percent.

(2) $\chi^2$ Test

In the $\chi^2$ test, a sufficiently large variance $\sigma^2$ is collected in advance, and the base variance $\Sigma^2_0$ of a reference value is calculated. Then, the difference of the variance $\sigma^2_{max}$ corresponding to the measurement data from the reference value $\Sigma^2_0$ is determined in the $\chi^2$ test, and it is checked whether or not the variances $\sigma^2_{max}$ is an outlier. The variance $\sigma^2_{max}$ is derived in the adaptive lattice filter algorithm, and the number of samples is $1/(1-\omega)$. Therefore, the $\chi^2$ value of the $\chi^2$ test is expressed by the following equation (7).

$$\chi^2_0[n] = \frac{\sigma^2_{\max}[n]/(1-\omega)}{\Sigma^2_0} \quad (7)$$

Assuming that the $\chi^2$ test is conducted on both sides of the significant level $\alpha$ in the $\chi^2$ distribution with the degree of freedom $\phi$, it is determined according to the following rule whether or not the variance $\sigma^2_{max}$ is an outlier. The degree of freedom $\phi$ is "number of samples–1". Furthermore, $\chi^{2(\alpha)}(\phi)$ and $\chi^2_\alpha(\phi)$ are respectively the upper side $\alpha$ point and the lower side $\alpha$ point in the $\chi^2$ distribution with the degree of freedom $\phi$.

$$\chi^{2(\alpha/2)}\left(\frac{1}{1-\omega}-1\right) < \chi_0^2[n] \rightarrow \text{outlier of upper side}$$

$$\chi_0^2[n] < \chi_{\alpha/2}^2(\phi)\left(\frac{1}{1-\omega}-1\right) \rightarrow \text{outlier of lower side}$$

<Method of Detecting Stationary Change>

(1) Hypothesis Test for Population Ratio

When the status of an object to be monitored changes, the above-mentioned outlier occurs. That is, an outlier is detected only by momentarily changing the status of an object to be monitored. On the other hand, the status monitor apparatus 1 according to an embodiment of the present invention aims at detecting a stationary change of the status of an object to be monitored. Then, the status monitor apparatus 1 performs an outlier test a plurality of times and determines whether or not the status of an object to be monitored has changed based on the test results.

In the following explanation, the frequency of an outlier test for a predetermined period is W, and the frequencies of detecting the upper side and lower side outliers in the period are respectively k1 and k2. Thus, the probabilities $\pi 1$ and $\pi 2$ of detecting upper side outliers and lower side outliers are respectively expressed by the following equations.

$$\pi 1 = k1/W$$

$$\pi 2 = k2/W$$

When the probabilities $\pi 1$ and $\pi 2$ are lower than the significant level $\alpha/2$ in the outlier test, it is assumed that the reference value $\sigma^2_0$ ($\Sigma^2_0$ in the $\chi^2$ test) is appropriate. When the probabilities $\pi 1$ and $\pi 2$ are sufficiently larger than the significant level $\alpha/2$, it is assumed that the reference value $\sigma^2_0$ ($\Sigma^2_0$ in the $\chi^2$ test) has changed. These assumptions can be expressed by the following equations.

Upper Side Change $H_0: \pi 1 \leq \alpha/2$ $H_1: \pi 1 > \alpha/2$

Lower Side Change $H_0: \pi 2 \leq \alpha/2$ $H_1: \pi 2 > \alpha/2$

Therefore, it can be determined by conducting a hypothesis test for population ratio whether or not a stationary change has occurred. The statistical test amounts Z1 and Z2 are expressed by the following equation (8).

$$Z_1 = \frac{\pi_1 - \alpha/2}{\sqrt{(\alpha/2)(1-\alpha/2)/W}} \quad Z_2 = \frac{\pi_2 - \alpha/2}{\sqrt{(\alpha/2)(1-\alpha/2)/W}} \quad (8)$$

Assuming that the upper side $\beta$ point of the standard normal distribution is $Z^\beta$, it is determined based on the following rules whether or not a stationary change has occurred.

If $Z^\beta < Z1$, stationary change has occurred in upper side.

If $Z^\beta < Z2$, stationary change has occurred in lower side.

(2) Method of Serially Calculating an Outlier Detection Ratio $\pi$

The outlier detection ratio $\pi$ can be expressed by the following equation using a forgetting factor $\eta$ ($0 < \eta << 1$), where D[n] is a discrete variable indicating 1 when an outlier is detected, and zero when no outlier is detected.

$$\pi[n] = (1-\eta)\pi[n-1] + \eta D[n]$$

In this case, $\pi$ corresponds to the outlier detection ratio when the frequency of the outlier test is $1/\eta$. That is, using this method, an outlier detection ratio can be obtained each time measurement data is acquired from an object to be monitored. Therefore, when $\pi[n]$ obtained above is substituted to the equation (8) above, it can be serially determined whether or not the status of an object to be monitored has stationarily changed.

Thus, the status monitor apparatus 1 according to an embodiment of the present invention determines whether or not the status of an object to be monitored has stationarily changed based on the measurement data acquired from the object. The sequence is summarized below.

(1) The measurement data x[n] is acquired from the object to be monitored at time n.

(2) The fluctuation p[n] of the measurement data is calculated.

(3) The variance $\sigma^2$ of the normal white noise component is calculated using the adaptive lattice filter.

(4) The maximum value $\sigma^2_{max}$ of the variance is calculated.

(5) The F value (the $\chi^2$ value in the $\chi^2$ test) is calculated.

(6) It is checked whether or not the calculated F value is an outlier in the F distribution.

(7) It is determined that the status of the object to be monitored has stationarily changed when the occurrence probability of the outlier exceeds a predetermined value.

<Method of Learning Reference Value>

(1) The reference value learning unit 17 updates the reference value $\sigma^2_0$ when the status of an object to be monitored stationarily change. In concrete examples, the maximum value $\sigma^2_{max}$ when a stationary change of the status of an object to be monitored is detected is set as a new reference value.

(2) Periodical Update

Figure 7:
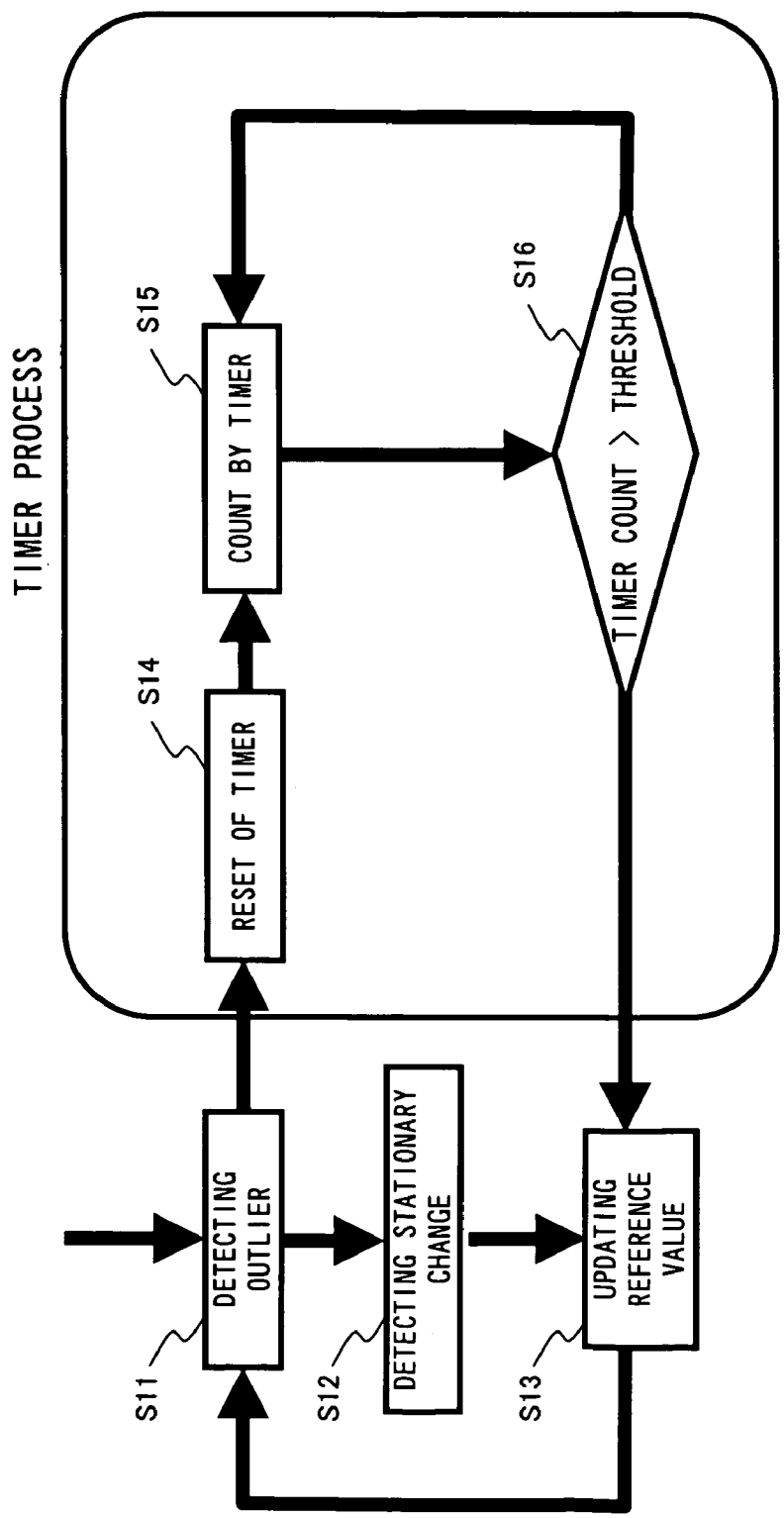
FIG. 7 is a flowchart of the process of updating a reference value.

FIG. 7 is a flowchart of the process of updating a reference value. The reference value is updated as described above when the status of an object to be monitored stationarily changes (steps S11 through S13). However, although the status of an object to be monitored does not stationarily change, the reference value is updated when a predetermined time kept by the timer 18 passes (steps S15, S16, and S13). When the reference value is updated in steps S11 through S13, the timer 18 is reset (step S14). That is, unless an outlier is continuously detected for a predetermined time, the reference value is updated. By performing the learning process, an appropriate reference value can be constantly used.

Embodiment 1

Figure 8:
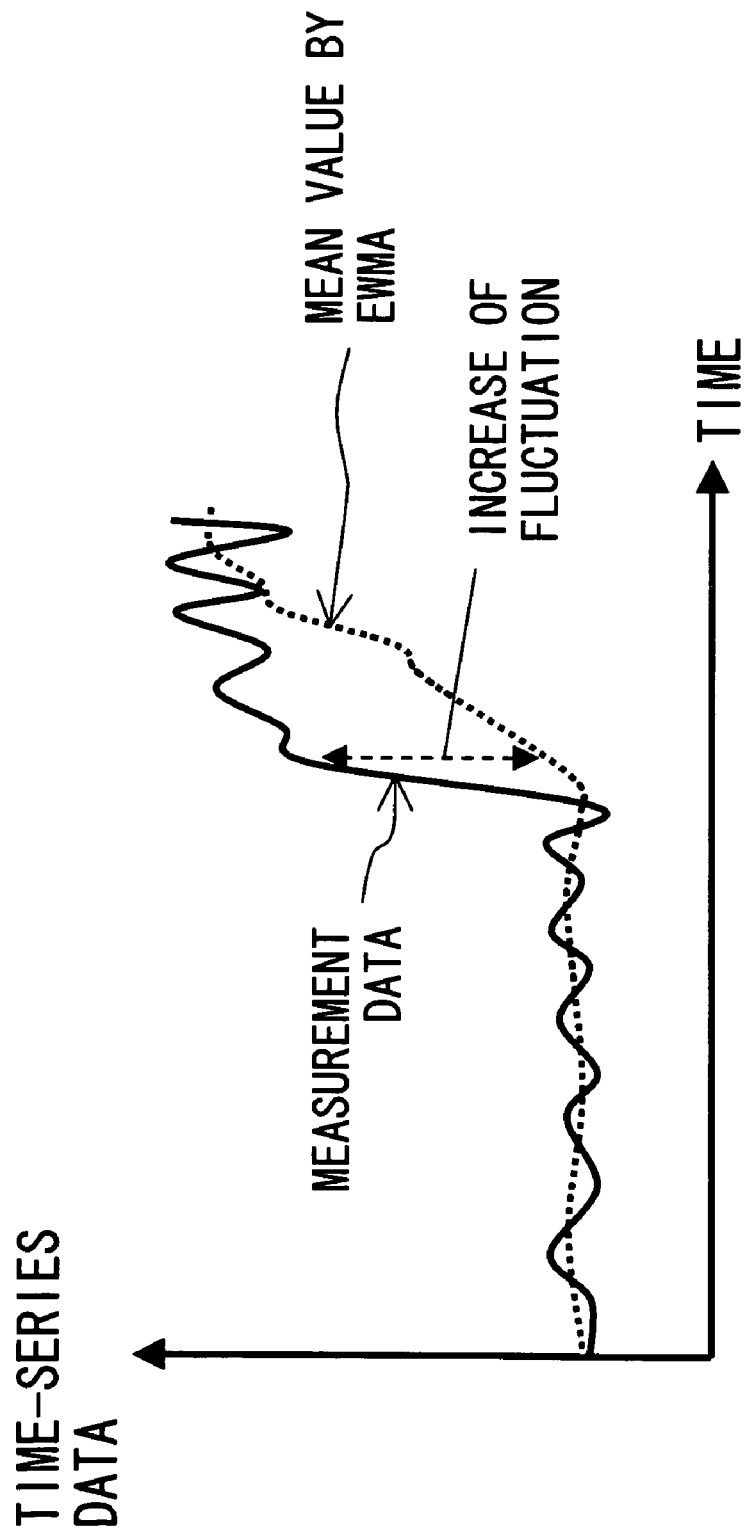
FIG. 8 shows the relationship between time-series data and its fluctuation.

FIG. 8 shows the relationship between the time-series data and its fluctuation. In this example, a moving average (EWMA) is used in calculating the fluctuation of data.

There occurs a delay in trailing the mean value calculated using the EWMA when the data is changed suddenly. Therefore, when the data is changed suddenly, the fluctuation of the data becomes large. Therefore, according to the status monitor apparatus 1 in the embodiment, a sudden change in data can be detected.

Figure 9:
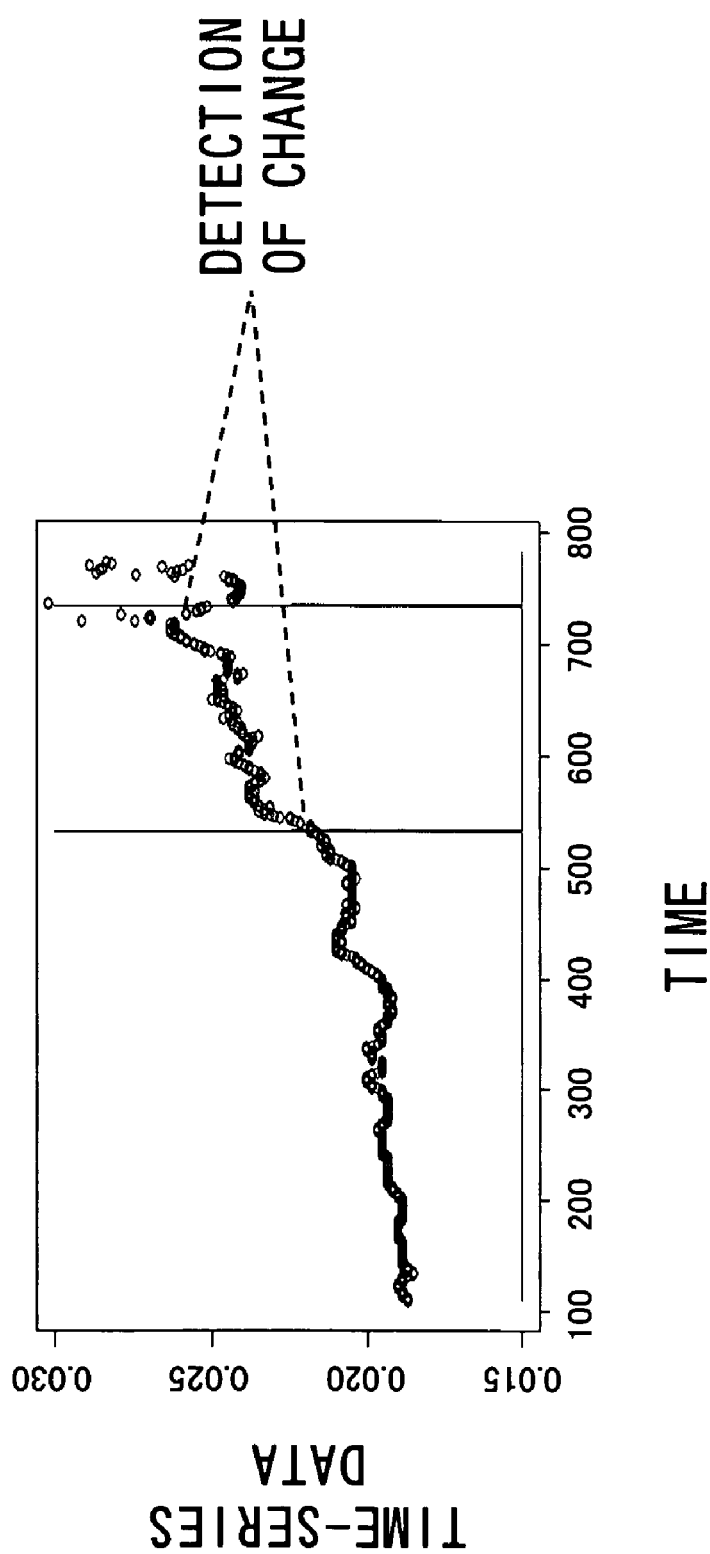
FIG. 9 shows a result of a simulation performed when time-series data is provided.

FIG. 9 shows a result of a simulation when time-series data is given. As shown in FIG. 9, according to the status monitor apparatus 1 of the embodiment, a change in time-series data can be detected when the data suddenly changes, even if the amplitude of the data is small.

Embodiment 2

FIG. 10 is an explanatory view of the configuration and the operation of the network monitor system. The status monitor apparatus 1 according to the embodiment is provided for each of the network monitor devices A and B.

The network monitor devices A and B transmit a probing packet between them, and measure an end-to-end delay. Then, each monitor device monitors the status of a network based on the behavior of observed delayed data. In the monitoring method, it is not necessary to set in advance a threshold (for example, a delay time) relating to the operation of the network, but an abnormal condition of the network can be detected by automatically detecting a "change" in the status of the network from the observed time-series data. It is not easy to determine in advance an appropriate threshold for monitor of the status of a network, and it is necessary to set again the threshold when the configuration of a system is changed.

FIGS. 11A and 11B show the relationship between the traffic environment and the delay characteristic. In this example, FIG. 11A shows a result of a simulation where only VoIP traffic is given in the path to be observed. FIG. 11B shows a result of a simulation where VoIP traffic, FTP traffic, and HTTP traffic are given to the path to be observed. As shown in FIGS. 11A and 11B, when the traffic amount in the network is identical, there occurs a larger delay when a plurality types of traffic are coexist. Although there is a period in which delayed data is not detected at time 800 to 1000, this corresponds to the state in which no probing packets are detected due to excess traffic, etc.

FIGS. 12A and 12B are flowcharts of the process of determining the status of a network based on the delayed data. The process is performed each time the monitor apparatus receives a probing packet in the system shown in FIG. 10.

In the process flow 1 shown in FIG. 12A, the delayed data relating to the newly received probing packet is acquired in step S21. In step S22, the fluctuation of a delay time is calculated using the EWMA. In step S23, an adaptive lattice filter is applied to the fluctuation of the delay time, and a normal white noise component is extracted. In step S24, the number of samples is estimated, and the variance of the normal white noise component is obtained. In step S25, it is checked whether or not the variance of the normal white noise component is an outlier for the reference value by the F test (or $\chi^2$ test) In step S26, it is determined based on the result of the F test whether or not the status of the network has stationarily changed. When a change of the status of the network is detected, the reference value is updated in step S27.

In the process flow 2 shown in FIG. 12B, the process in step S31 is performed in place of the process in step S22 in the process flow 1. That is, in the process flow 2, the difference between the delayed data obtained immediately before and the newly obtained delayed data is output as the fluctuation of a delay time.

FIGS. 13A, 13B, 14A, and 14B shows results of a simulation of an operation of the status monitor apparatus 1 when the traffic shown in FIGS. 11A and 11B is provided to the network. FIGS. 13A and 13B show examples of the operations when the process flow 1 shown in FIG. 12A is performed. FIGS. 14A and 14B show examples of the operations when the process flow 2 shown in FIG. 12B is performed.

According to the simulations, the fluctuation of traffic becomes large in any case when the load of a network exceeds 50 percent, and an alarm indicating a status change is raised. The upward arrow shown in FIGS. 13A and 13B show the alarm indicating that the variance of the normal white noise caused by the fluctuation of a delay time has changed upward with respect to the reference value. Similarly, the downward arrow indicates the alarm that the variance of the normal white noise has changed downward with respect to the reference value.

Embodiment 3

Figure 15:
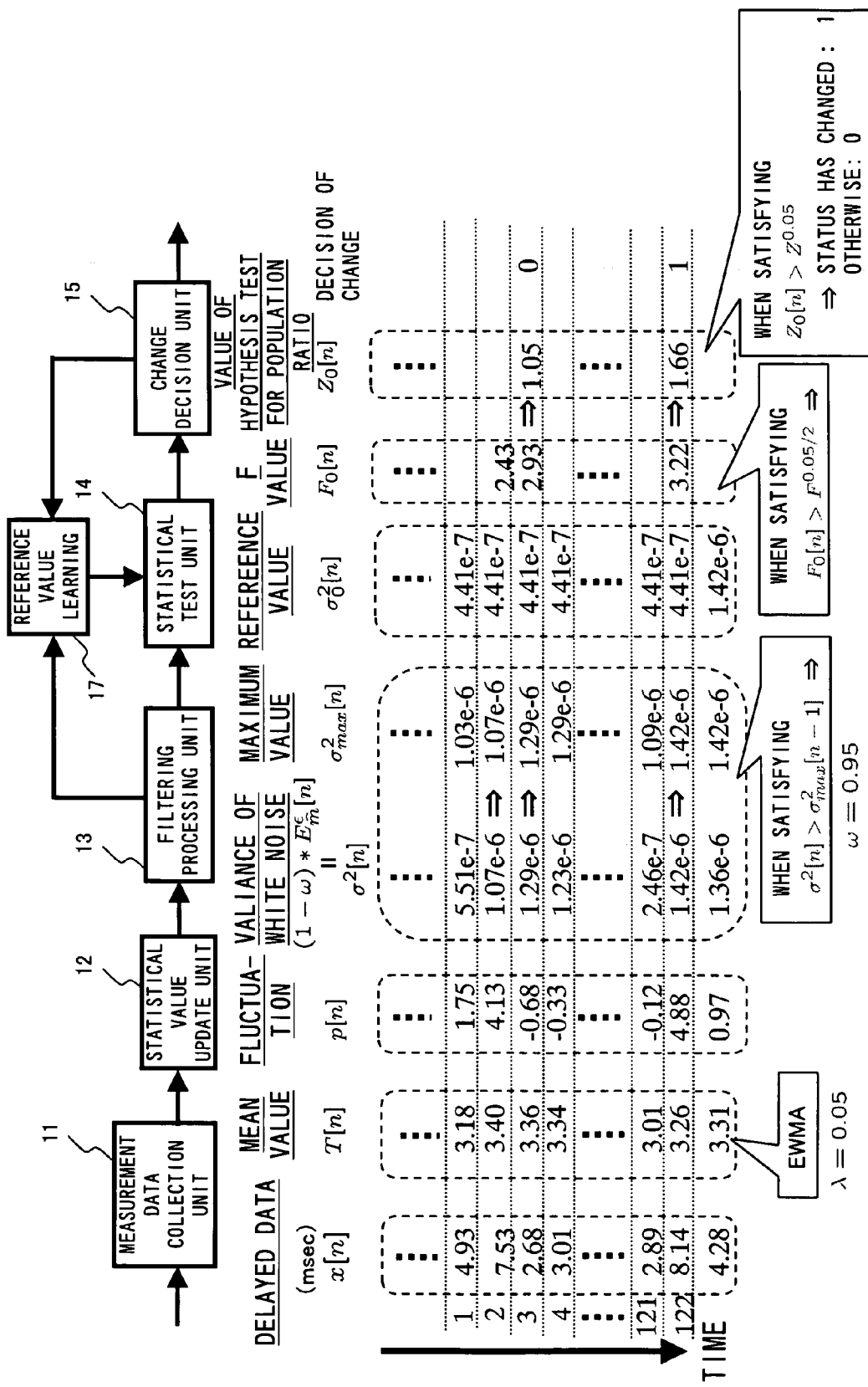
FIG. 15 shows the procedure of the status monitor apparatus.

FIG. 15 shows the procedure of the status monitor apparatus 1. In this example, a delay time in the communication network is given as time-series data, and the EWMA is used as a mean value. Then, the status monitor apparatus 1 calculates the F value each time the delayed data is obtained, and monitors the stationary change of the status of the network based on the F value. In this embodiment, the significant level $\alpha$ is 5 percent. Therefore, when an event that occurs only at 5 percent statistically occurs at a probability higher than a predetermined rate, it is determined that "the status of a network has stationarily changed."

The maximum value $\sigma^2_{max}$ of variance is updated when the newly calculated variance $\sigma^2[n]$ is larger than the $\sigma^2_{max}[n-1]$ held at the time. In this example, at time 2, 3, and 122, the newly calculated variance is set as a new maximum value. If the variance $\sigma^2[n]$ is equal to or smaller than the $\sigma^2_{max}[n-1]$, it is updated according to the forgetting factor $\omega$.

When the F value exceeds a predetermined value ($F^{0.05/2}$ in this example), it is assumed that an outlier occurs, and a hypothesis test for population ratio is performed correspondingly. In this example, the hypothesis test for population ratio is performed at time 3 and 122. Then, it is determined based on the hypothesis test for population ratio whether or not the status of the network has stationarily changed. In this example, it is determined that the status of the network has changed at time 122.

The reference value $\sigma^2_0$ is updated when it is determined that the status of the network has stationarily changed. In this example, the reference value is updated at time 123.

<Hardware Configuration>

Figure 16:
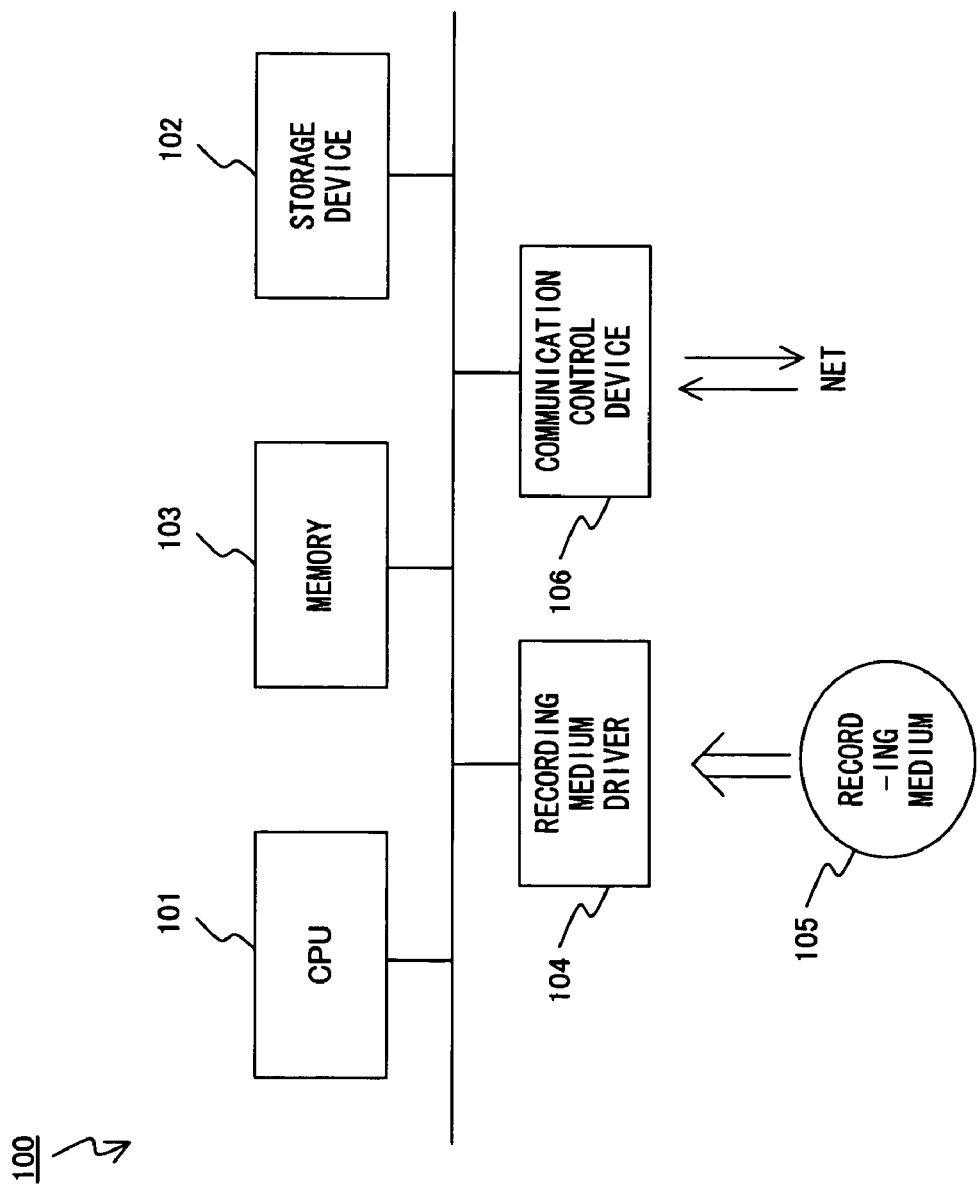
FIG. 16 is a block diagram of a computer which executes a program describing the function of the present invention.

The status monitor apparatus 1 is realized by a computer executing a program describing the above-mentioned process. FIG. 16 is a block diagram of a computer 100 which executes the program.

A CPU 101 loads a program describing the above-mentioned process from a storage device 102 to memory 103, and executes the program. The storage device 102 is, for example, a hard disk, and stores the program. The storage device 102 may be an external storage device connected to the computer 100. The memory 103 is, for example, semiconductor memory, and is used as a work area of the CPU 101.

A recording medium driver 104 accesses a portable recording medium 105 at an instruction of the CPU 101. It is assumed that the portable recording medium 105 includes, for example, a semiconductor device, a medium for inputting/outputting data by a magnetic operation (flexible disk, magnetic tape, etc.), and a medium for inputting/outputting data by an optical operation (optical disk, etc.). A communication control device 106 transmits/receives data over a network at an instruction of the CPU 101.

The program according to the present invention is provided, for example, in the following method.

(1) The program is installed on a computer and provided. In this case, the program is installed on the computer 100, for example, before the shipment of the computer 100.

(2) The program is stored in a portable recording medium and provided. In this case, the program stored in the portable recording medium 105 is basically installed on the storage device 102 through the recording medium driver 104.

(3) The program is provided from a program server provided in a network. In this case, the computer 100 acquires a corresponding program by downloading it from a program server. Otherwise, the computer 100 can request the program server to execute the program, and receive an execution result.

<Comparison with Patent Document 2>

Figure 17:
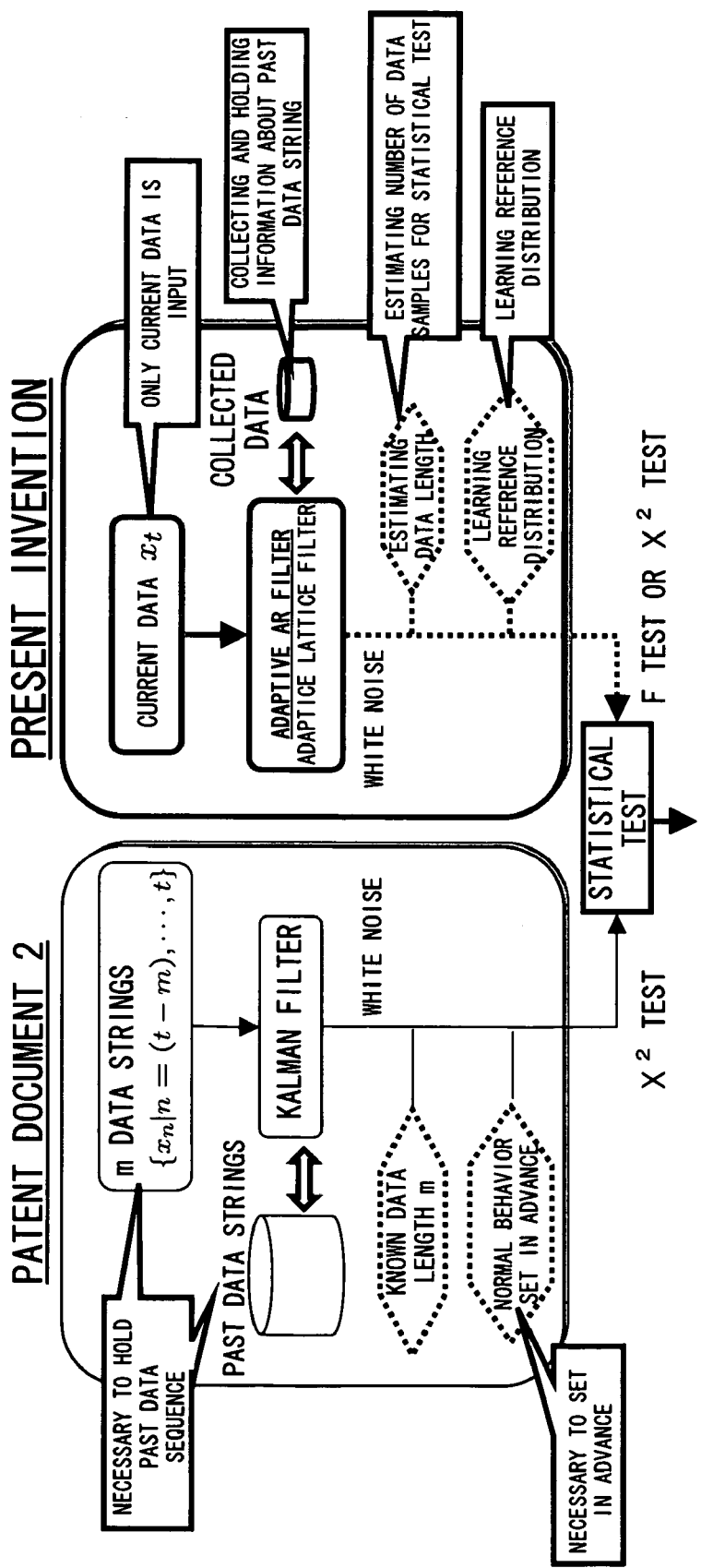
FIG. 17 is an explanatory view of the difference between the present invention and the patent document 2.

FIG. 17 is an explanatory view of the difference between the method according to the present invention and the method described in the patent document 2. The method described in the patent document 2 and the method according to the present invention can detect a status change on time-series data by conducting a statistical test. However, they are different from each other in the following points.

(1) The present invention uses an adaptive lattice filter while the invention described in the patent document 2 uses a Kalman filter. Since the Kalman filter extracts white noise using a past data string, it is necessary to hold the past data string for a predetermined period. Therefore, the size of memory for storage of data is large. On the other hand, the status monitor apparatus 1 according to the present invention can extract white noise using an arithmetic result for the past data and newly obtained data. Therefore, the amount of data to be stored becomes smaller. The data held by the statistical value memory 19 of the status monitor apparatus 1 according to the present invention are previous data, a mean value of the previous data, a parameter of an adaptive lattice filter for the previous data, a reference value, a forgetting factor, etc. Since an adaptive lattice filter is much lower in computational complexity than a Kalman filter, the process can be realized at a high speed.

(2) In the method described in the patent document 2, a fixed data length of the time-series data required in the statistical process is given in advance. On the other hand, in the method according to the present invention, the number of samples for the statistical test is estimated based on the forgetting factor used in an adaptive lattice filter.

(3) In the method described in the patent document 2, it is necessary to set in advance the behavior in a normal operation. On the other hand, in the method according to the present invention, the reference value or the reference distribution for the statistical process can be dynamically learned (that is, updated). Therefore, although the configuration of an object to be monitored is changed, it is not necessary to newly generate a reference value or a reference distribution. Therefore, the method according to the present invention is advantageous in scalability.

What is claimed is:

1. A status monitor apparatus, comprising:
   a collection unit to collect data relating to the status of an object to be monitored in a time series;
   a calculation unit to calculate fluctuation of data obtained by said collection unit;
   an extraction unit to apply an adaptive lattice filter to the fluctuation calculated by said calculation unit, and to extract normal white noise component corresponding to the fluctuation from among parameters appearing in a calculating process of the adaptive lattice filter;
   a detection unit to detect a change in status of the object to be monitored based on behavior of the normal white noise component extracted by said extraction unit;
   an estimation unit to estimate the number of samples for a statistical test based on a forgetting factor used in the adaptive lattice filter, wherein
   said detection unit includes
      a first decision unit to decide whether or not the variance of the normal white noise component is within a scone determined based on a reference value by the statistical test of the estimated number of samples; and
      a second decision unit to decide whether or not the status of the object to be monitored has changed based on a decision result by said first decision unit.

2. The apparatus according to claim 1, wherein said collection unit collects data relating to a communication parameter in a communication network.

3. The apparatus according to claim 1, wherein upon acquiring new data, said calculation unit calculates the fluctuation of the data using EWMA of the new data.

4. The apparatus according to claim 1, wherein said calculation unit outputs as the fluctuation of data a difference between the data newly acquired by said collection unit and data acquired immediately before the newly acquired data.

5. The apparatus according to claim 1, wherein said first decision unit decides whether or not the variance is within the predetermined scope depending on the reference value by applying an F test to the variance.

6. The apparatus according to claim 1, wherein said first decision unit decides whether or not the variance is within the predetermined scope depending on the reference value by applying a $\chi^2$ test to the variance.

7. The apparatus according to claim 1, wherein said second decision unit decides whether or not the status of the object to be monitored has changed by conducting a hypothesis test for population ratio using a significant level defining the scope and a detection ratio indicating a rate at which the variance of the normal white noise component is out of the predetermined scope.

8. The apparatus according to claim 7, wherein the detection ratio is updated while gradually forgetting a past detection ratio.

9. The apparatus according to claim 1, further comprising a reference value update unit to update the reference value using the variance of the normal white noise component when it is determined that the status of the object to be monitored has changed.

10. The apparatus according to claim 9, wherein said reference value update unit updates the reference value using variance of newly obtained normal white noise component each time a predetermined time passes.

11. The apparatus according to claim 1, wherein said detection unit includes:
   a maximum value update unit to update a maximum value using a previous maximum value of variance of the normal white noise component, variance of the newly obtained normal white noise component, and a forgetting factor;
   a third decision unit to decide whether or not the maximum value of variance updated by said maximum value update unit is out of a predetermined scope corresponding to a reference value; and a fourth decision unit to decide based on a determination result by said first decision unit whether or not the status of the object to be monitored has changed.

12. A status monitor method, comprising:

collecting data relating to status of an object to be monitored in a time series:

calculating fluctuation of the collected data;

applying an adaptive lattice filter to the calculated fluctuation;

extracting a normal white noise component corresponding to the fluctuation from among the parameters appearing in the adaptive lattice filter;

detecting a change of the status of the object to be monitored based on behavior of the extracted normal white noise component;

estimating the number of samples for a statistical test based on a forgetting factor used in the adaptive lattice filter;

deciding whether or not the variance of the normal white noise component is within a scope determined based on a reference value by the statistical test of the estimated number of samples; and deciding whether or not the status of the object to be monitored has changed based on a decision of whether the variance is within the scone;

wherein the status monitor method is implemented in a status monitor apparatus realized by a computer.

13. A recording medium recording a status monitor program and enabling a computer to execute the program, a status monitor method according to the program comprising:

collecting data relating to status of an object to be monitored in a time series:

calculating fluctuation of the collected data;

applying an adaptive lattice filter to the calculated fluctuation;

extracting a normal white noise component corresponding to the fluctuation from among the parameters appearing in the adaptive lattice filter detecting a change of the status of the object to be monitored based on behavior of the extracted normal white noise component;

estimating the number of samples for a statistical test based on a forgetting factor used in the adaptive lattice filter;

deciding whether or not the variance of the normal white noise component is within a scone determined based on a reference value by the statistical test of the estimated number of samples; and deciding whether or not the status of the object to be monitored has changed based on a decision of whether the variance is within the scope.

14. The status monitor method of claim 12, wherein the collected data is information identifying one or more behaviors of the object, and the object is one of an electrical system and a physical facility.

* * * * *